US012354415B2

United States Patent
Wulfe et al.

(10) Patent No.: US 12,354,415 B2
(45) Date of Patent: Jul. 8, 2025

(54) METHOD AND SYSTEM FOR LEARNING REWARD FUNCTIONS FOR DRIVING USING POSITIVE-UNLABELED REWARD LEARNING

(71) Applicant: Toyota Research Institute, Los Altos, CA (US)

(72) Inventors: Blake Wulfe, San Francisco, CA (US); Adrien Gaidon, San Jose, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 652 days.

(21) Appl. No.: 17/586,389

(22) Filed: Jan. 27, 2022

(65) Prior Publication Data

US 2023/0237856 A1 Jul. 27, 2023

(51) Int. Cl.
*G06N 20/00* (2019.01)
*G07C 5/00* (2006.01)
*G07C 5/02* (2006.01)
*B60W 60/00* (2020.01)

(52) U.S. Cl.
CPC .............. *G07C 5/008* (2013.01); *G06N 20/00* (2019.01); *G07C 5/02* (2013.01); *B60W 60/001* (2020.02); *B60W 2552/00* (2020.02); *B60W 2554/4046* (2020.02); *B60W 2555/00* (2020.02)

(58) Field of Classification Search
CPC .......... G07C 5/008; G07C 5/02; G06N 20/00; B60W 2552/00; B60W 2555/00; B60W 60/001; B60W 2554/4046
See application file for complete search history.

(56) References Cited

U.S. PATENT DOCUMENTS

| 10,678,241 B2 | 6/2020 | Palanisamy et al. |
| 2019/0072959 A1* | 3/2019 | Palanisamy ............... G06N 7/01 |
| 2019/0179328 A1 | 6/2019 | Movert et al. |
| 2021/0201891 A1* | 7/2021 | Lyu .......................... G10L 25/63 |

FOREIGN PATENT DOCUMENTS

| CN | 112829747 A | 5/2021 | |
| EP | 3722907 A1 * | 10/2020 | ........... G05D 1/0212 |
| EP | 3750765 A1 | 12/2020 | |
| KR | 20200142716 A | 12/2020 | |
| WO | 2021104833 A1 | 6/2021 | |

* cited by examiner

*Primary Examiner* — Vivek D Koppikar
*Assistant Examiner* — Jeffrey R Chalhoub
(74) *Attorney, Agent, or Firm* — DINSMORE & SHOHL LLP

(57) ABSTRACT

A method includes receiving first driving data associated with a first vehicle, receiving second driving data associated with one or more vehicles around the first vehicle, creating training data by labeling the first driving data as positive data and treating the second driving data as unlabeled, and using the training data to train a classifier to predict whether driving data input to the classifier is positive or unlabeled.

16 Claims, 5 Drawing Sheets

METHOD AND SYSTEM FOR LEARNING REWARD FUNCTIONS FOR DRIVING USING POSITIVE-UNLABELED REWARD LEARNING

TECHNICAL FIELD

The present specification relates to learning reward functions and more particularly to a method and system for learning reward functions for driving using positive-unlabeled reward learning.

BACKGROUND

Autonomous vehicles may utilize a reward function that indicates desirable driving behavior to train a planner, learn a driving policy, or perform other tasks. However, defining the reward function may be a difficult task. While it may be possible for a human expert to manually define the reward function, this may be difficult and time consuming. Accordingly, it may be desirable for a system to learn a reward function from driving data. Accordingly, a need exists for improved methods and systems for learning reward functions from driving data.

SUMMARY

In an embodiment, a method may include receiving first driving data associated with a first vehicle, receiving second driving data associated with one or more vehicles around the first vehicle, creating training data by labeling the first driving data as positive data and treating the second driving data as unlabeled, and using the training data to train a classifier to predict whether driving data input to the classifier is positive or unlabeled.

In another embodiment, a method may include receiving driving data from a first vehicle comprising information about driving behavior of the first vehicle and information about driving behavior of other vehicles around the first vehicle, extracting features of the driving data, inputting the features into a trained classifier, and determining a reward function for the driving data based on the output of the classifier. The classifier may be trained to receive input driving data and output a probability that the driving data is associated with an expert driver.

In another embodiment, a remote computing device may include a controller. The controller may be programmed to receive first driving data associated with a first vehicle driven by an expert driver, receive second driving data associated with one or more vehicles around the first vehicle, create training data by labeling the first driving data as positive data and treating the second driving data as unlabeled, use the training data to train a classifier to predict whether driving data input to the classifier is positive or unlabeled, and determine a reward function based on an output of the classifier.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include a method and system for learning reward functions for driving using positive-unlabeled reward learning. As disclosed herein, an expert driver may drive an ego vehicle equipped with one or more vehicle sensors in a variety of driving scenarios. As the expert driver drives the ego vehicle, the vehicle sensors may collect data regarding the ego vehicle, other vehicles on the road, and context information (e.g., roadway data and environment data).

After this driving data is collected by the vehicle sensors, the data associated with the ego vehicle driven by the expert driver may be labeled as positive and the data associated with the other vehicles may be unlabeled. The data associated with the ego vehicle driven by the expert driver is labeled as positive because it is presumed that the expert driver drives in a desirable manner. The data associated with the other vehicles is unlabeled because it is unknown whether or not the drivers of those vehicles drive in a desirable manner.

After the driving data is labeled, it may be used as training data to train a classifier using supervised learning techniques. In particular, a large amount of data associated with a plurality of driving trips performed by one or more expert drivers may be collected and labeled, and used as training data. A classifier may then be trained to classify input driving data as either positive or unlabeled, based on the training data. In particular, the classifier may be trained to predict a likelihood or probability that driving data input into the classifier is driving data associated with an expert driver. The output of the classifier may then be used as a reward function. That is, the output of the classifier may be used as a reward function to indicate how closely particular driving data adheres to expert driving.

Figure 1:
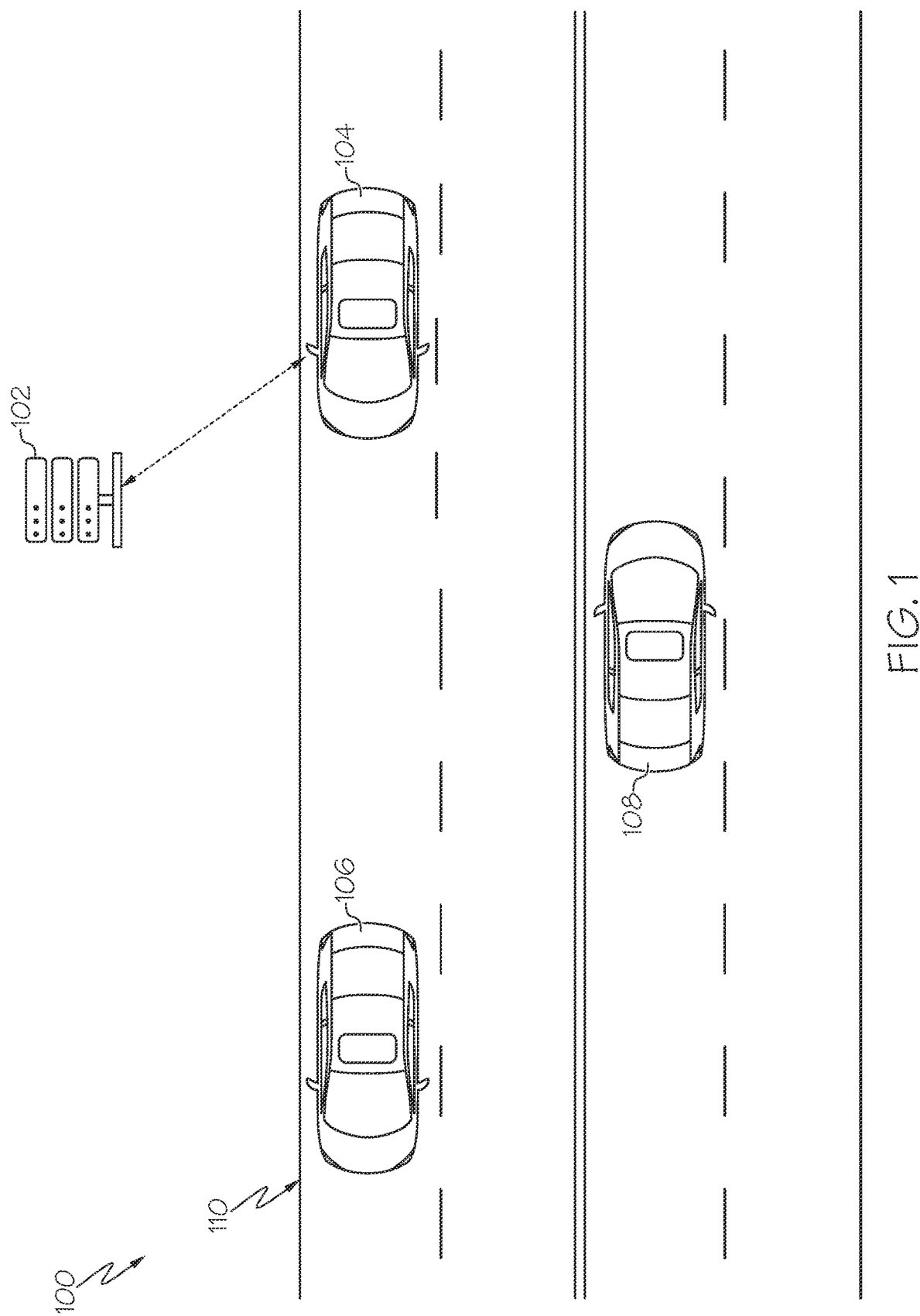
FIG. 1 schematically depicts a system comprising a server for determining reward functions for driving using positive-unlabeled reward learning, according to one or more embodiments shown and described herein.

Turning now to the figures, FIG. 1 schematically depicts a system for learning reward functions for driving using positive-unlabeled reward learning. In the example of FIG. 1, a system 100 includes a server 102 communicatively coupled to an ego vehicle 104. The ego vehicle 104 may be driven by an expert driver. In particular, the expert driver of the ego vehicle 104 may be hired by an organization desiring to utilize the system 100 to learn reward functions. The expert driver may be hired to model ideal driving behavior. For example, the expert driver may pay close attention to other drivers, drive defensively, and obey all traffic laws. In other examples, the expert driver may model other types of desirable driving behavior.

The ego vehicle 104 may include one or more sensors or other equipment to detect driving behavior of the ego vehicle 104 and other vehicles on the road, as explained in further detail below. For example, the sensors of the ego vehicle 104 may detect the driving behavior of the ego vehicle 104 (e.g., its position, speed, and trajectory). The sensors of the ego vehicle 104 may also detect the driving behavior of other vehicles, such as the vehicles 106 and 108 driving along the same road 110 as the ego vehicle 104.

In the example of FIG. 1, the ego vehicle 104 is a connected vehicle that is able to communicate remotely with systems outside of the vehicle (e.g., with the server 102). Thus, as the ego vehicle 104 collects sensor data, the ego vehicle 104 may transmit the collected sensor data to the server 102. However, in other examples, the ego vehicle 104 may store the collected sensor data locally (e.g., in a data storage device on the ego vehicle 104).

The server 102 may be communicatively coupled to the ego vehicle 104. While the example of FIG. 1 illustrates a single ego vehicle 104 being communicatively coupled to the server 102, in other examples, any number of connected vehicles may be communicatively coupled to the server 102. Each such vehicle may be driven by an expert driver such that the server 102 may collect data from a plurality of vehicles driven by expert drivers.

In the illustrated example, the server 102 comprises a cloud computing device. In some examples, the server 102 may comprise a road-side unit (RSU) positioned near the road 110. In these examples, the system 100 may include any number of RSUs spaced along the road 110 such that each RSU covers a different service area. That is, as the ego vehicle 104 or other vehicles drive along the road 110, the vehicles may be in range of different RSUs at different times such that different RSUs provide coverage at different locations. Thus, as the ego vehicle 104 drives along the road 110, the ego vehicle 104 may move between coverage areas of different RSUs.

In other examples, the server 102 may be any type of server or remote computing device and may be positioned remotely from the road 110. In some examples, the server 102 may be an edge server. In some examples, the server 102 may be a moving edge server, such as another vehicle.

Figure 2:
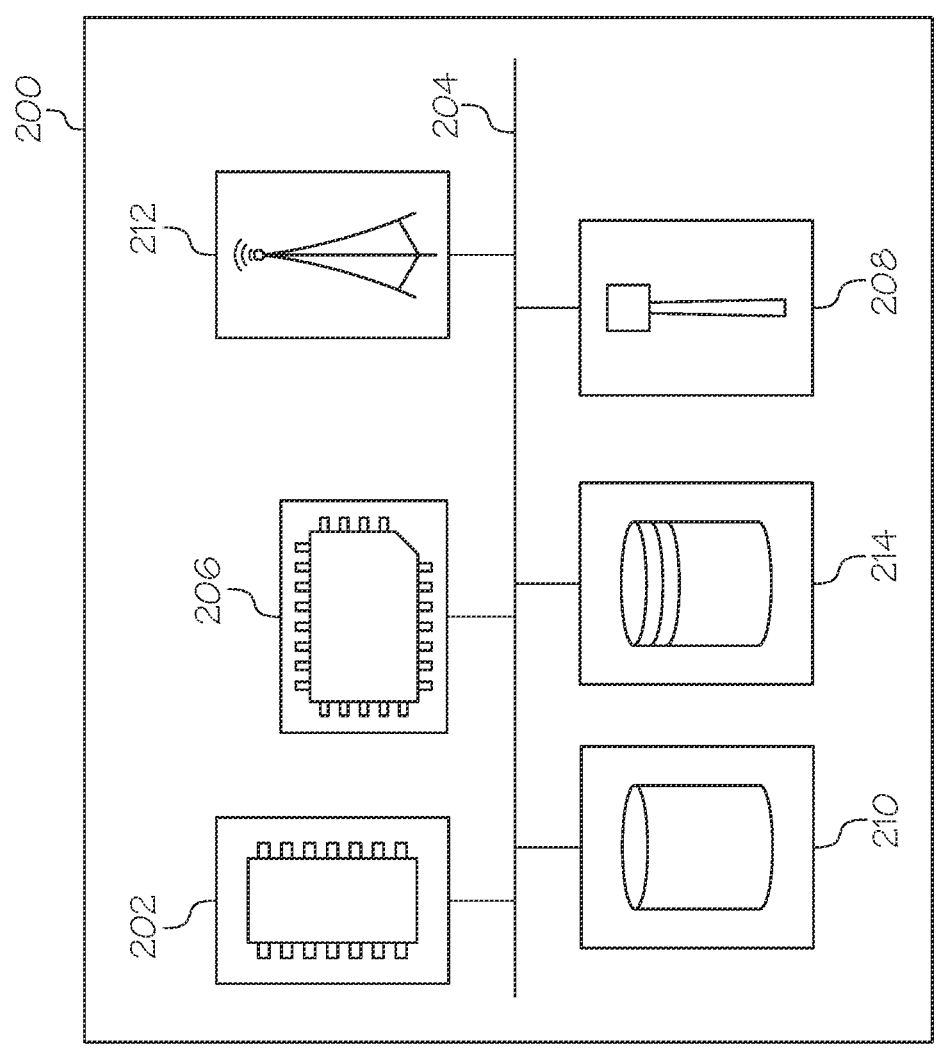
FIG. 2 depicts a schematic diagram of a vehicle system, according to one or more embodiments shown and described herein.

FIG. 2 depicts a vehicle system 200 that may be included in the ego vehicle 104 of FIG. 1. In the example of FIG. 2, the vehicle system 200 includes one or more processors 202, a communication path 204, one or more memory modules 206, a satellite antenna 208, one or more vehicle sensors 210, a network interface hardware 212, and a data storage component 214, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the vehicle system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as Wi-Fi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors), proximity sensors, location sensors (e.g., GPS modules), and the like. In embodiments, the vehicle sensors 210 may monitor the surroundings of the vehicle and may detect positions, trajectories, velocities, accelerations, and other data associated with other vehicles (e.g., the vehicles 106 and 108 of FIG. 1). The vehicle sensors 210 may also detect data associated with the ego vehicle 104 (e.g., position, trajectory, velocity, acceleration, and the like). The vehicle sensors 210 may also detect roadway data such as road geometry and other traffic features (e.g., traffic light states). In some examples, the vehicle sensors 210 may also detect environment data such as weather conditions. The data captured by the vehicle sensors 210 may be stored in the data storage component 214.

Still referring to FIG. 2, the vehicle system 200 comprises network interface hardware 212 for communicatively coupling the vehicle system 200 to the server 102. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In embodiments, the network interface hardware 212 of the vehicle system 200 may transmit data about objects detected by the vehicle system 200, as disclosed in further detail below.

Still referring to FIG. 2, the vehicle system 200 comprises a data storage component 214. The data storage component 214 may store data used by various components of the vehicle system 200. In addition, the data storage component 214 may store data collected by the vehicle sensors 210.

In some embodiments, the vehicle system 200 may be communicatively coupled to the server 102 by a network. In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
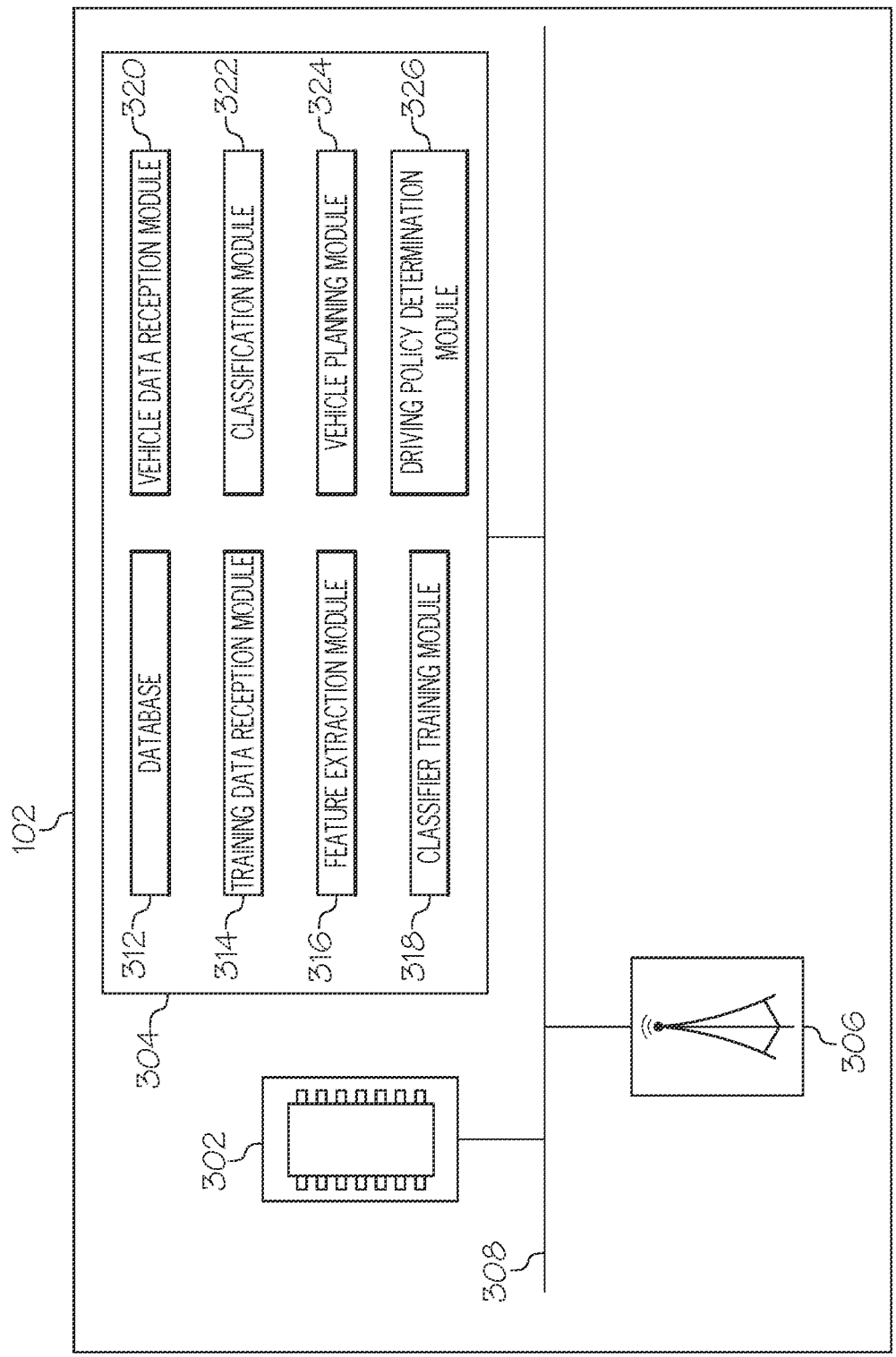
FIG. 3 depicts a schematic diagram of the server of FIG. 1, according to one or more embodiments shown and described herein.

Now referring to FIG. 3, the server 102 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. In some examples, the network interface hardware 306 may include two different channels including a Dedicated Short-Range Communication (DSRC) channel and a millimeter wave radio channel, as discussed in further detail below. The network interface hardware 306 of the server 102 may transmit and receive data to and from vehicles (e.g., the ego vehicle 104 of FIG. 1).

The one or more memory modules 304 include a database 312, a training data reception module 314, a feature extraction module 316, a classifier training module 318, a vehicle data reception module 320, a classification module 322, a vehicle planning module 324, and a driving policy determination module 326. Each of the database 312, the training data reception module 314, the feature extraction module 316, the classifier training module 318, the vehicle data reception module 320, the classification module 322, the classification module 322, the vehicle planning module 324, and the driving policy determination module 326 may be a program module in the form of operating systems, application program modules, and other program modules stored in the one or more memory modules 304. In some embodiments, the program module may be stored in a remote storage device that may communicate with the server 102. In some embodiments, one or more of the database 312, the training data reception module 314, the feature extraction module 316, the classifier training module 318, the vehicle data reception module 320, the classification module 322, the classification module 322, the vehicle planning module 324, and the driving policy determination module 326 may be stored in the one or more memory modules 206 of the vehicle system 200 of a vehicle. Such a program module may include, but is not limited to, routines, subroutines, programs, objects, components, data structures and the like for performing specific tasks or executing specific data types as will be described below.

The database 312 may store driving data received from the ego vehicle 104. The database 312 may also store training data used to train a classifier, as explained in further detail below. The database 312 may also store the parameters of the trained classifier, as explained in further detail below. The database 312 may also store other data used by the memory modules 304.

The training data reception module 314 may receive training data. As discussed above, the vehicle sensors 210 of the ego vehicle 104 may collect driving data associated with the ego vehicle 104 and may also collect driving data associated with other vehicles on the road (e.g., the vehicles 106 and 108 of FIG. 1). Because the ego vehicle 104 is driven by an expert driver, it is presumed that the ego vehicle 104 is being driven in a desirable manner. Accordingly, the training data reception module 314 may label driving data indicating driving behavior of the ego vehicle 104 as positive. However, it is unknown whether or not the other vehicles are driving in a desirable manner. As such, the driving data indicating driving behavior of vehicles other than the ego vehicle 104 may be unlabeled. Thus, as the ego vehicle 104, and any other expert driven vehicles collect driving data, any driving data associated with expert driven vehicles may be labeled as positive and driving data associated with other vehicles may be unlabeled. As such, a set of labeled training data may be collected comprising positive data associated with expert driven vehicles and unlabeled data associated with other vehicles. This training data may be transmitted to the server 102 and received by the training data reception module 314.

Referring still to FIG. 3, the feature extraction module 316 may extract features from the training data received by the training data reception module 314. The extracted features may be input into a classifier, as disclosed in further detail below. The features extracted by the feature extraction module 316 may capture elements of driving behavior of a particular vehicle. In particular, the extracted features may capture elements of driving behavior desired to be rewarded by the reward function.

In particular, the extracted features may comprise data about how a particular vehicle is driving (e.g., speed and trajectory), as well as context information. For example, the extracted features may include information about the driving behavior of other nearby vehicles as well as roadway information. For example, the extracted features may include information about roadway geometry, the presence of various road signs, the states of traffic lights, and the like. In some examples, the extracted features may include environmental data such as weather conditions. Thus, the features extracted by the feature extraction module 316 may indicate driving behavior of a vehicle in a particular context.

Referring still to FIG. 3, the classifier training module 318 may utilize the training data received by the training data reception module 314 to train a classifier, as disclosed herein. As discussed above, the database 312 may store parameters of a classifier. The classifier may be trained to receive features associated with driving behavior of a vehicle as input and output a likelihood that the vehicle was driven by an expert. In other words, the classifier may determine how close to expert driving behavior a particular input driving behavior is.

As discussed above, the training data received by the training data reception module 314 may include certain driving data labeled as positive and other driving data that is unlabeled. In one example, the training data may comprise multiple pieces of training data, with each piece of training data indicating driving behavior of a particular vehicle during a particular time period. The feature extraction module 316 may extract features from each piece of training data, and the classifier training module 318 may utilize the training data to train the classifier. As discussed above, the classifier takes features associated with driving data as an input, and outputs an estimated likelihood that the driving data is associated with an expert driver. The classifier may comprise a number of parameters, which may be modified during training, that are used to generate an output based on an input. In the illustrated example, the classifier comprises a neural network. However, in other examples, the classifier may comprise other types of model.

The classifier training module 318 may train the classifier using any known training technique. For example, the parameters of the classifier may be continually updated using an optimization method (e.g., gradient descent) to optimize the parameters to minimize a loss function based on a difference between the output of the classifier and the labeled values over the entire set of training data. After the classifier training module 318 trains the classifier, the learned parameters may be stored in the database 312. After the classifier is trained, it may be utilized to determine a reward function, as discussed below.

Referring still to FIG. 3, the vehicle data reception module 320 may receive vehicle data from a vehicle or another source. The server 102 may then determine a reward function associated with the vehicle data, as disclosed herein. As discussed above, after the classifier maintained by the server 102 is trained, it may be utilized to determine a reward function associated with driving data. The driving data for which a reward function is to be determined may be transmitted to the server 102 and may be received by the vehicle data reception module 320. For example, the driving data may be associated with a particular vehicle route or trajectory. After the vehicle data reception module 320 receives the vehicle data, the feature extraction module 316 may extract features from the vehicle data, which may be input to the classifier, as described below.

The classification module 322 may input the features of the vehicle data received by the vehicle data reception module 320 and extracted by the feature extraction module 316 into the classifier. The classifier may then output an estimated likelihood that the vehicle data is associated with an expert driver, based on the input features and the learned parameters of the trained classifier. The output of the classifier may be utilized as a reward function for a variety of tasks, such as vehicle planning or learning a driving policy. Examples of each of these applications is discussed in further detail below. However, in other examples, the reward function determined by the classification module 322 may be utilized for other applications as well.

Because the classifier was trained using driving data associated with an expert driver, the reward function output by the classification module 322 may indicate how closely the input driving data mirrors expert driving. However, if the classifier were trained using only expert driving data, the classifier might never encounter certain driving situations that an expert driver is unlikely to experience, such as near collisions. Thus, by also including unlabeled driving data from non-expert drivers in the training data, the classifier may learn ideal driving behavior in more potential driving situations. Thus, the reward function may be more robust when the classifier is trained on positive labeled data associated with expert drivers as well as unlabeled data from non-expert drivers.

Referring still to FIG. 3, the vehicle planning module 324 may perform planning for a vehicle, as disclosed herein. In particular, the vehicle planning module 324 may utilize the reward function determined by the classification module 322 to plan driving behavior for a particular driving situation. This may be determined on-line while an autonomous vehicle is driving.

When an autonomous vehicle encounters a new driving situation, the autonomous vehicle must determine how to navigate the driving situation in order to performance autonomous driving. One way for the autonomous driving vehicle to determine how to navigate the situation is to choose a plan that maximizes a reward function. The reward function may indicate which factors the autonomous vehicle should most value when determining the driving plan (e.g., obeying traffic laws, avoiding collisions, avoiding near collisions, and the like).

It may be possible to manually code a reward function to indicate which factors should be valued by the autonomous vehicle when determining a driving plan. However, this may be a difficult task and may be clouded by the particular preferences and judgment of the person coding the reward function. Thus, instead of manually determining a reward function, the autonomous vehicle may utilize the reward function determined by the classifier, as discussed above. For example, the autonomous vehicle may input a variety of driving plans into the classifier and may select the plan that maximizes the reward function output by the classifier.

Referring still to FIG. 3, the driving policy determination module 326 may utilize the reward function output by the classifier to determine a driving policy, as disclosed herein. This may be performed off-line to determine a driving policy to be implemented in a variety of driving situations. That is, the driving policy may be determined based on data previously collected and stored, rather than on-line while a vehicle is driving and collecting data in real-time.

In the examples discussed above, one or more expert drivers are hired to drive one or more vehicles in a desirable manner such that driving data can be collected while the expert drivers are driving. However, hiring expert drivers may be expensive. Furthermore, there is a limit to the number of driving situations that will be encountered by any one expert driver during any particular driving trip. As such, there is a limit to the amount of driving data that can be collected from vehicles driven by expert drivers. Thus, it may be desirable to collect additional data from vehicles not driven by experts. This may expand the pool of vehicles from which driving data can be collected, thereby increasing the amount of driving data that can be used to determine a driving policy, as disclosed herein.

In one example, a plurality of vehicles may be driven by any drivers who have agreed to share driving data collected by their vehicles (e.g., non-expert drivers). These vehicles may have one or more sensors that collect driving data, similar to the driving data collected by the ego vehicle 104 discussed above. In some examples, the driving data may be anonymized to alleviate privacy concerns. As these vehicles collect driving data, the driving data may be transmitted to the server 102. Thus, over time, the server 102 may collect a large amount of driving data from a variety of different drivers. However, because the driving data received in this manner comes from so many different drivers, all of whose level of driving skill is unknown and may vary wildly, the data cannot simply be labeled based on the type of driver driving a particular vehicle (e.g., based on whether or not the driver is a hired expert driver). Thus, an alternative method of labeling the data may be desirable.

In one example, the feature extraction module 316 may extract features from each set of received driving data, and the classification module 322 may output a reward function associated with each set of driving data. The driving policy determination module 326 may then label each set of driving data based on the reward function output by the classification module 322. For example, the driving policy determination module 326 may label each set of driving data that has an associated reward function greater than a predetermined threshold as positive, and may label other driving data as negative. As such, the driving policy determination module 326 may label a large amount of driving data in an automated manner.

After the driving data is labeled, the driving policy determination module 326 may utilize the labeled driving data to determine a driving policy. In one example, the driving policy determination module 326 may utilize the labeled driving data and associated reward functions to determine a driving policy by using reinforcement learning. However, in other examples, the driving policy determination module 326 may utilize the labeled driving data to determine a driving policy using other techniques.

Figure 4:
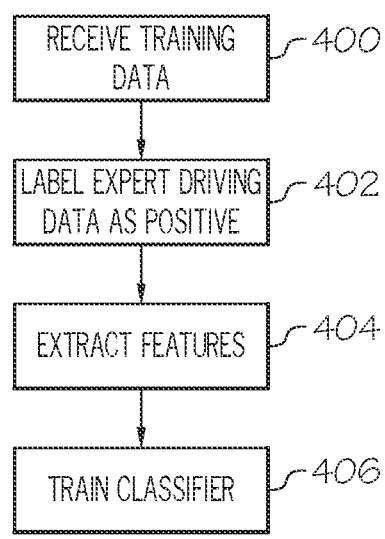
FIG. 4 depicts a flowchart of a method of training the server of FIGS. 1 and 3 to learn a reward functions, according to one or more embodiments shown and described herein.

FIG. 4 depicts a flowchart of an example method for training the classifier maintained by the server 102 of FIGS. 1 and 3. At step 400, the training data reception module 314 receives driving data to be used as training data. The training data may comprise driving data captured by the vehicle sensors 210 of the ego vehicle 104 when driven by an expert driver. The training data may comprise driving data associated with the ego vehicle 104, driving data associated with other vehicles around the ego vehicle 104 (e.g., vehicles 106 and 108 of FIG. 1), and context information such as roadway data and environment data. The roadway data may include information about roadway geometry, road signs, traffic light states, and the like. The environment data may include information such as weather data and other information about the environment that the ego vehicle 104 drives through.

At step 402, the training data reception module 314 labels the driving data associated with the ego vehicle 104 as positive. The driving data associated with the vehicles around the ego vehicle 104 may remain unlabeled. As such, the training data reception module 314 may create training data comprising positive labeled data associated with the ego vehicle 104 driven by the expert driver and unlabeled data associated with vehicles driven by other drivers.

At step 404, the feature extraction module 316 extracts features from the training data. The features extracted by the feature extraction module 316 may capture elements regarding the driving behavior of a particular vehicle in the context of the driving behavior of other vehicles, the roadway data, and the environment data.

At step 406, the classifier training module 318 trains the classifier based on extracted features of the training data. The classifier training module 318 may train the classifier to classify input driving data as either positive or unlabeled. That is, the classifier training module 318 may train the classifier to determine a probability that input driving data is associated with an expert driver.

Figure 5:
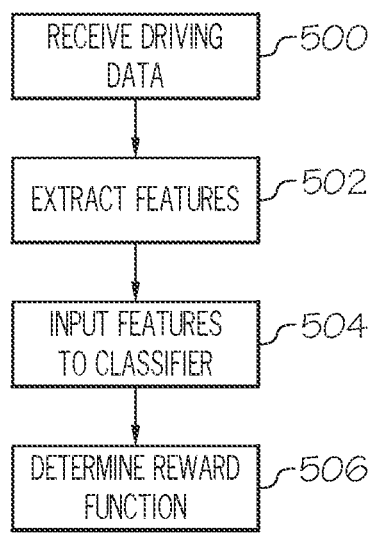
FIG. 5 depicts a flowchart of a method of using the trained server to determine a reward function for driving, according to one or more embodiments shown and described herein.

FIG. 5 depicts a flowchart of an example method for determining a reward function for driving data using the trained classifier maintained by the server 102 of FIGS. 1 and 3. At step 500, the vehicle data reception module 320 receives driving data from a vehicle. The driving data received by the vehicle data reception module 320 may be associated with any vehicle driven by any driver (e.g., not necessarily the ego vehicle 104 driven by an expert driver). At step 502, the feature extraction module 316 extracts features from the driving data received by the vehicle data reception module 320.

At step 504, the classification module 322 inputs the extracted features to the trained classifier. The classifier may then output an estimated probability that the input driving features are associated with an expert driver. At step 506, the classification module 322 determines a reward function based on the output of the classifier.

It should now be understood that embodiments described herein are directed to a method and system for learning reward functions for driving using positive-unlabeled reward learning. An expert driver may drive an ego vehicle having one or more vehicle sensors that detect information about the ego vehicle, information about other vehicles on the road, and context information. The driving data indicating the driving behavior of the ego vehicle may be labeled as positive and the driving data indicating the driving behavior of the other vehicles may be unlabeled to create labeled training data.

A classifier may be trained, using the labeled training data, to classify input driving data as either labeled or unlabeled. A reward function may then be determined for any driving data input to the classifier based on an output of the classifier. The reward function output by the classifier may be used in a variety of applications including planning for an autonomous vehicle or learning a driving policy.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   receiving first driving data associated with a first vehicle;
   receiving second driving data associated with one or more vehicles around the first vehicle;
   creating training data comprising the first driving data labeled as positive data and the second driving data as unlabeled data;
   using the training data to train a classifier to predict whether driving data input to the classifier is positive or unlabeled;
   receiving third driving data associated with a second vehicle;
   inputting the third driving data to the classifier after the classifier has been trained;
   determining a reward function based on an output of the classifier;
   determining a driving policy based on the reward function; and
   causing the second vehicle to drive autonomously based on the driving policy.

2. The method of claim 1, further comprising:
   using the training data to train the classifier to receive a set of driving data as an input; and
   outputting a probability that the set of driving data is associated with an expert driver.

3. The method of claim 1, wherein the classifier comprises a neural network.

4. The method of claim 1, wherein the first vehicle is driven by an expert driver.

5. The method of claim 1, further comprising:
   extracting features from the training data; and
   using the features extracted from the training data to train the classifier.

6. The method of claim 1, further comprising:
   receiving roadway data associated with a road on which the first vehicle drives; and
   creating the training data by associating the first driving data and the second driving data with the roadway data.

7. The method of claim 1, further comprising:
   receiving environment data associated with an environment through which the first vehicle drives; and
   creating the training data by associating the first driving data and the second driving data with the roadway data.

8. The method of claim 1, further comprising:
   receiving a plurality of sets of driving data associated with a plurality of vehicle routes;
   extracting features from each set of driving data associated with each vehicle route;
   inputting the features extracted from each set of driving data into the trained classifier;
   determining a reward function associated with each vehicle route based on an output of the trained classifier; and
   selecting the vehicle route having the reward function with a largest value.

9. The method of claim 1, further comprising:
   receiving driving data associated with a plurality of unknown vehicles;
   extracting features from the driving data associated with each of the unknown vehicles;
   inputting the features associated with each of the unknown vehicles into the trained classifier;
   determining a reward function for the driving data associated with each of the unknown vehicles based on an output of the trained classifier; and
   determining second training data by labeling the driving data associated with each of the unknown vehicles based on the respective reward functions.

10. The method of claim 9, further comprising:
    labeling the driving data associated with each of the unknown vehicles having a reward function with a value greater than a predetermined threshold as positive; and
    labeling the driving data associated with each of the unknown vehicles having a reward function with a value less than or equal to the predetermined threshold as negative.

11. The method of claim 9, further comprising:
    determining a driving policy based on the second training data using reinforcement learning.

12. A remote computing device comprising a controller programmed to:
    receive first driving data associated with a first vehicle driven by an expert driver;
    receive second driving data associated with one or more vehicles around the first vehicle;
    create training data comprising the first driving data labeled as positive data and the second driving data as unlabeled data;
    use the training data to train a classifier to predict whether driving data input to the classifier is positive or unlabeled;
    receive third driving data associated with a second vehicle;
    input the third driving data to the classifier after the classifier has been trained;
    determine a reward function based on an output of the classifier;
    determine a driving policy based on the reward function; and cause the second vehicle to drive autonomously based on the driving policy.

13. The remote computing device of claim 12, wherein the controller is further programmed to:
   use the training data to train the classifier to receive a set of driving data as an input; and
   output a probability that the set of driving data is associated with the expert driver.

14. The remote computing device of claim 12, wherein the controller is further programmed to:
   extract features from the training data; and
   use the features extracted from the training data to train the classifier.

15. The remote computing device of claim 12, wherein the controller is further programmed to:
   receive a plurality of sets of driving data associated with a plurality of vehicle routes;
   extract features from each set of driving data associated with each vehicle route;
   input the features extracted from each set of driving data into the trained classifier;
   determine a reward function associated with each vehicle route based on an output of the trained classifier; and
   select the vehicle route having the reward function with a largest value.

16. The remote computing device of claim 12, wherein the controller is further programmed to:
   receive driving data associated with a plurality of unknown vehicles;
   extract features from the driving data associated with each of the unknown vehicles;
   input the features associated with each of the unknown vehicles into the trained classifier;
   determine a reward function for the driving data associated with each of the unknown vehicles based on an output of the trained classifier; and
   determine second training data by labeling the driving data associated with each of the unknown vehicles based on the respective reward functions.

* * * * *